United States Patent [19]

Yamamoto et al.

[11] Patent Number: 5,022,737

[45] Date of Patent: Jun. 11, 1991

[54] PLASTIC CLADDING COMPOSITION FOR PLASTIC CORE OPTICAL FIBER, AND PLASTIC CORE OPTICAL FIBER PREPARED THEREFROM

[75] Inventors: Takashi Yamamoto, Hiroshima; Tsuruyoshi Matsumoto, Otake; Katsuhiko Shimada, Otake; Yoshihiro Uozu, Otake; Ryuji Murata, Iwakuni, all of Japan

[73] Assignee: Mitsubishi Rayon Company Ltd., Tokyo, Japan

[21] Appl. No.: 443,794

[22] Filed: Nov. 22, 1989

Related U.S. Application Data

[63] Continuation of Ser. No. 81,758, Aug. 5, 1987, abandoned.

[30] Foreign Application Priority Data

Aug. 6, 1986 [JP] Japan .................................. 61-183342
Feb. 26, 1987 [JP] Japan .................................. 62-41379
Mar. 31, 1987 [JP] Japan .................................. 62-76016
Apr. 3, 1987 [JP] Japan .................................. 62-82704

[51] Int. Cl.$^5$ .............................................. G02B 6/02
[52] U.S. Cl. ............................. 350/96.29; 350/96.34; 428/373; 522/182; 526/246
[58] Field of Search ........................... 526/246; 522/182; 350/96.29, 96.34; 428/373

[56] References Cited

U.S. PATENT DOCUMENTS 3,993,834 11/1976 Chimura et al. ............ 526/328.5 X
4,551,209 4/1985 Skutnik ........................... 350/96.34

FOREIGN PATENT DOCUMENTS 128516 12/1984 European Pat. Off. .

Primary Examiner—Joseph L. Schofer
Assistant Examiner—J. M. Reddick
Attorney, Agent, or Firm—Finnegan, Henderson, Farabow, Garrett & Dunner

[57] ABSTRACT

Disclosed is a cladding composition for a plastic clad plastic core optical fiber, which comprises (a) an ultraviolet ray-curable monofunctional acrylic or α-fluoroacrylic monomer, (b) a polyfunctional acrylate or α-fluoroacrylate having at least two acryloyl or α-fluoroacryloy radicals in the molecule and (c) a photoinitiator. The difference ($n_1 - n_2$) between the refractive index $n_1$ of the plastic core and the refractive index $n_2$ of a cured product of the cladding composition is at least 0.01. The plastic clad plastic core optical fiber inhibits an enhanced heat resistance.

9 Claims, No Drawings

PLASTIC CLADDING COMPOSITION FOR PLASTIC CORE OPTICAL FIBER, AND PLASTIC CORE OPTICAL FIBER PREPARED THEREFROM

This application is a continuation of application Ser. No. 07/081,758, filed Aug. 5, 1987, now abandoned.

BACKGROUND OF THE INVENTION

(1) Field of the Invention

The present invention relates to a plastic cladding composition for a plastic core optical fiber, and further, to a plastic core optical fiber prepared from this cladding composition.

(2) Description of the Related Art

A plastic clad plastic core optical fiber prepared by conjugate spinning of a thermoplastic polymer as the core and a thermoplastic polymer as the cladding material has an excellent bending resistance and, therefore, optical fibers of this type have been widely used as light information transmitting media in the field of factory automation and the field of short-to-medium distance communication, such as short distance communication in an automobile, or for a large-scale display device. The application ranges of optical fibers of this type are now being broadened.

However, since the heat resistance temperature of plastic optical fibers used in these fields is about 100° C. at highest, the uses and way of use are restricted and must be improved.

As a means for satisfying this requirement, a method for preparing a heat-resistant plastic optical fiber by conjugate spinning of a heat-resistant polymer such as a polycarbonate or 4-methyl-pentene-1 polymer as the core and a thermoplastic polymer having a low refractive index as the cladding material is proposed in Japanese Unexamined utility Model Publication No. 50-44544 or Japanese Unexamined Patent Publication No. 57-46204, No. 57-179805 or No. 60-32004.

The heat-resistant plastic core optical fiber prepared according to this method appears to have an appropriate heat resistance, but when the fiber is exposed to a high-temperature atmosphere for a long time, the light transmittance thereof is drastically degraded This is because, since this plastic clad plastic core optical fiber is prepared by conjugate spinning conducted at a very high temperature, the plastic material undergoes thermal degradation during the spinning process. Especially, since the heat resistance of the thermoplastic polymer cladding is not high, the thermoplastic polymer is seriously damaged by the high-temperature exposure in the conjugate spinning process.

U.S. Pat. No. 4,511,209 discloses a cladding composition for plastic clad silica core optical fibers, which comprises a highly fluorinated monofunctional acrylate, a polyfunctional acrylate being trifunctional or higher serving as a crosslinking agent, a monofunctional or trifunctional thiol functioning as a synergist, and a photoinitiator. In order to maintain a good pliability in the formed polymer cladding, the highly fluorinated monofunctional acrylate of the cladding composition has an alkyl radical substituted with at least 12 fluorine atoms, and a specific thiol compound such as γ-mercaptopropyltrimethoxysilane is used as the synergist.

According to this known technique, the compatibility of the cladding composition with the crosslinkable polyfunctional acrylate is poor and, therefore, the plastic cladding often becomes turbid and it is difficult to obtain a plastic clad silica core optical fiber having excellent light transmission characteristics.

SUMMARY OF THE INVENTION

It is therefore a principal object of the present invention to provide a plastic clad plastic core optical fiber having a good heat resistance.

Other objects and advantages will be apparent from the following description.

In accordance with one aspect of the present invention, there is provided a cladding composition for a plastic clad plastic core optical fiber having a plastic core with a refractive index $n_1$, which comprises (a) an ultraviolet ray-curable monofunctional acrylic or α-fluoroacrylic monomer, (b) a polyfunctional acrylate or α-fluoroacrylate having at least two acryloyl or α-fluoroacryloyl radicals in the molecule, and (c) a photoinitiator, the refractive index $n_2$ of a cured product of the composition satisfying a requirement of $(n_1 - n_2) \geq 0.01$.

In accordance with another aspect of the present invention, there is provided a plastic clad plastic core optical fiber comprising a plastic core with a refractive index $n_1$ and an ultraviolet ray-cured cladding composition with a refractive index $n_2$, wherein said ultraviolet ray-cured cladding composition is a cured product of a cladding composition comprising (a) an ultraviolet ray-curable monofunctional acrylic or α-fluoroacrylic monomer, (b) a polyfunctional acrylate or α-fluoroacrylate having at least two acryloyl or α-fluoroacryloyl radicals in the molecule, and (c) a photoinitiator, and the difference $(n_1 - n_2)$ between the refractive index $n_1$ of the plastic core and the refractive index $n_2$ of the cured cladding composition is at least 0.01.

DESCRIPTION OF THE PREFERRED EMBODIMENTS

As the core-forming thermoplastic material used in the present invention, there can be mentioned a homopolymer ($n_1 = 1.49$) or copolymer ($n_1 = 1.47$ to 1.49) of methyl methacrylate, a homopolymer ($n_1 = 1.58$) or copolymer ($n_1 = 1.50$ or 1.58) of styrene, a 4-methylpentene-1 polymer ($n_1 = 1.46$), a polycarbonate ($n_1 = 1.50$ to 1.57) and a polyglutarimide polymer ($n_1 = 1.50$-1.55) disclosed in European Patent Specification 01555672A, which has recurring base units represented by the following formula:

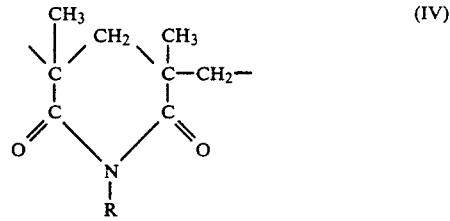

(IV)

wherein R represents a hydrogen atom, an alkyl group having 1 to 20 carbon atoms, a cycloalkyl group having 3 to 20 carbon atoms, or a phenyl group.

The core-forming thermoplastic material preferably has a glass transition temperature ($T_g$) of at least 100° C., more preferably at least 120° C.

As the monofunctional acrylic or α-fluoroacrylic monomer constituting the cladding composition, there can be mentioned monomers represented by the following formulae:

 (I)

 (II)

and

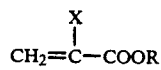 (III)

wherein X and Y represent H or F; R represents a linear or branched alkyl group having 1 to 18 carbon atoms, a cycloalkyl group having 3 to 18 carbon atoms, a phenyl group, H, or a group $-R_1OH$ or $-R_1-OOC-R_2-COOH$ in which $R_1$ represents a linear or branched alkyl group having 1 to 18 carbon atoms and $R_2$ represents a linear or branched alkyl group having 1 to 18 carbon atoms or a phenyl group; and l, is an integer of from 1 to 12; m is an integer of from 5 to 12, preferably from 7 to 10; and n is an integer of from 1 to 3, preferably 1 or 2.

This monomer is a component controlling the characteristics of the cladding composition, especially the refractive index $n_2$ of the cured cladding composition. The kind and amount of the monomer are determined so that the relationship $(n_1-_2)\geqq 0.01$ is established between the refractive index $n_1$ of the polymer core and the refractive index $n_2$ of the cured cladding composition.

In order to obtain a plastic optical fiber having good light transmission characteristics, the cladding composition of the present invention preferably comprises at least 50% by weight, especially 50% to 98% by weight of a fluorinated monofunctional acrylate or α-fluoroacrylate having a refractive index smaller than 1.38.

A plastic clad plastic core optical fiber prepared by using a cladding composition comprising as the fluorinated monofunctional acrylic or α-fluoroacrylic monomer a mixture of 1 to 60% by weight of a highly fluorinated monofunctional acrylate or α-fluoroacrylate represented by the general formula (I) in which m is preferably an integer of from 7 to 10 and 99 to 40% by weight of a lowly fluorinated monofunctional acrylate or α-fluoroacrylate represented by the general formula (II) in which n is preferably 1 or 2 has a high mechanical strength and good flexural characteristics. The cladding polymer prepared from a cladding composition comprising a fluoromonofunctional acrylate or α-fluoroacrylate mixture in which the ratio of the acrylate or α-fluoroacrylate represented by the formula (I) to the acrylate or α-fluoroacrylate represented by the formula (II) is smaller than 1/99 is hard and has a poor softness, and the refractive index tends to increase. In addition, a plastic clad plastic core optical fiber having a large numerical aperture is difficult to obtain. When a fluoromonofunctional acrylate or α-fluoroacrylate mixture in which the above-mentioned ratio is larger than 60/40 is used, the compatibility with the polyfunctional acrylate or α-fluoroacrylate and photoinitiator constituting the cladding composition of the present invention is degraded, and the formed cladding polymer is opaque and has a poor toughness.

As the highly fluorinated monofunctional acrylate or α-fluoroacrylate represented by the formula (I) used in the present invention, there can be mentioned acrylates and α-fluoroacrylates having a fluoroalkyl radical selected from 1,1,2,2-tetrahydroperfluorododecyl, 1,1,2,2-tetrahydroperfluorodecyl, trihydroperfluoroheptyl, trihydroperfluoroundecyl, perfluorodecyl, $-C_8F_{17}$, $-C_{10}F_{21}$ and $-C_{12}F_{25}$ radicals.

As the lowly fluorinated monofunctional acrylate or α-fluoroacrylate represented by the formula (II), there can be mentioned acrylates and α-fluoroacrylates having a fluoroalkyl radical selected from 2,2,3,3-tetrafluoropropyl, trifluoroethyl, 2,2,3,3,3-pentafluoropropyl, 1-trifluoromethyl-2,2,2-trifluoroethyl, 1-trifluoromethyl-1,2,2,2-tetrafluoroethyl, 2,2,3,4,4,4-hexafluorobutyl, 1-methyl-2,2,3,4,4,4-hexafluorobutyl, 1,1-dimethyl-2,2,3,3-tetrafluoropropyl and 1,1-dimethyl-2,2,3,4,4,4-hexafluorobutyl radicals.

As the monofunctional acrylic or α-fluoroacrylic monomer represented by the formula (III), there can be mentioned acrylic acid and α-fluoroacrylic acid, and acrylates and α-fluoroacrylates having a radical selected from 2-ethylhexyl, stearyl, cyclohexyl, benzyl, tetrahydrofurfuryl, 2-hydroxyethyl, 2-hydroxypropyl, 2-methoxyethyl, 2-ethoxyethyl, butoxyethyl, methoxydiethylene glycol, methoxytriethylene glycol, methoxytetraethylene glycol, methoxynonaethylene glycol, methoxytricosaethylene glycol, 2-phenoxyethyl, phenoxydiethylene glycol, phenoxytetraethylene glycol, phenoxyhexaethylene glycol, ethylene oxide-modified phosphoric acid $[-OCH_2CH_2O-P=O(OH)_2]$, ethylene oxide-modified phenoxylated phosphoric acid $[-OCH_2CH_2O-P=O(OC_6H_5)_2]$, ethylene oxide-modified phthalic acid

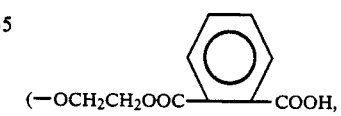

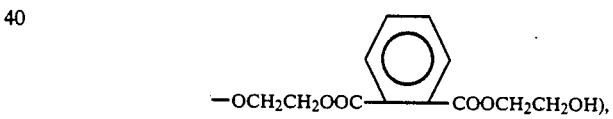

ethylene oxide-modified succinic acid ($-OCH_2CH_2OOC-CH_2CH_2COOH$), and N, N-dimethylaminoethyl. In order to improve the heat resistance and chemical resistance of the plastic clad plastic core optical fiber of the present invention, a polyfunctional acrylate or α-fluoroacrylate having at least two acryloyl or α-fluoroacryloyl radicals in the molecule is incorporated in the cladding composition. As the polyfunctional acrylate or α-fluoroacrylate, preferably a polyfunctional acrylate or α-fluoroacrylate represented by the following formula (V):

 (V)

wherein X represents H or F, A represents for a group formed by removing at least 2 hydroxyl groups from a polyol compound, and p is an integer of at least 2, is incorporated in an amount of 1 to 20% by weight into the cladding composition.

As specific examples of the group A in the formula (V), the following groups can be mentioned:

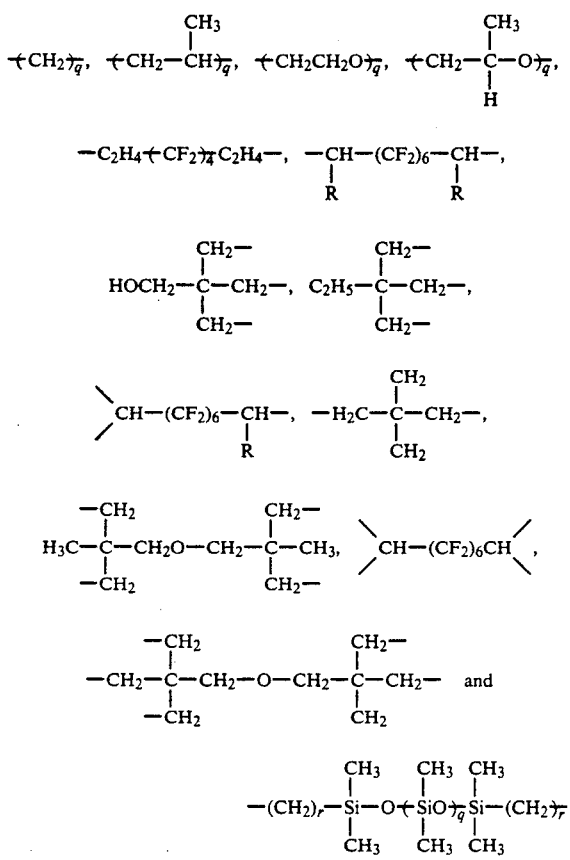

wherein q is an integer of 1 to 1000 and r is an integer of 3 to 10.

If the polyfunctional acrylate or α-fluoroacrylate is contained in an amount larger than 20% by weight in the cladding composition, the cured product of the cladding composition tends to be hard and brittle and the transparency is reduced. Accordingly, when a cladding composition containing a large quantity of this polyfunctional acrylate or α-fluoroacrylate is prepared, care should be taken to ensure that these disadvantages do not arise.

As specific examples of the photoinitiator to be incorporated in the cladding composition of the present invention, there can be mentioned benzoin, benzoin alkyl ethers, 2-methylbenzoin, benzophenone, Michler's ketone, benzyl, benzyldimethylketal, anthraquinone, methylanthraquinone, diacetyl, acetophenone, diphenyl sulfide and anthracene. Preferably the photoinitiator is incorporated in the cladding composition in an amount of 0.1 to 10% by weight.

Hindered phenols and thiodicarboxylic acid esters may be incorporated singly or in combination as the stabilizer in an amount of 0.05 to 10% by weight based on the cladding composition, for improving the heat resistance and light resistance of the cured cladding composition. For example, there can be mentioned hindered phenols such as 2,6-di-t-butyl-4-methylphenol, 2,2'-methylenebis(4-methyl-6-t-butylphenol), 4,4'-thiobis(6-t-butyl-3-methylphenol), 4,4'-butylidenebis(3-methyl-6-t-butylphenol), 1,3,5-trimethyl-2,4,6-tris(3,5-di-t-butyl-4-hydroxybenzyl)benzene, 1,3,5-tris(2-methyl-4-hydroxy-5-t-butylphenol)butane, octadecyl-3-(3,5-di-t-butyl-4-hydroxyphenyl)propionate, triethylene glycol-bis[3-(3-t-butyl-5-methyl-4-hydroxyphenyl)propionate] and 1,6-hexanediol-bis[3-(3,5-di-t-butyl-4-hydroxyphenyl)propionate], and thiodicarboxylic acid esters such as dilauryl thiodipropionate and distearyl thiodipropionate.

According to the present invention, a plastic clad plastic core optical fiber having a heat resistance temperature higher than 120° C., the production of which is very difficult according to the ordinary conjugate spinning process, can be prepared very easily. Accordingly, the present invention is very advantageous from the industrial viewpoint. The present invention is especially valuable for preparing a heat-resistant plastic core optical fiber by using as the plastic core material a polycarbonate, a polyglutarimide represented by the formula (IV) or a 4-methylpentene-1 polymer.

The present invention will now be described in detail with reference to the following examples.

EXAMPLE 1

A cladding composition of Run No. 1 shown in Table 1 was flow-coated to a thickness of 100 μm on a glass sheet and the film was irradiated with ultraviolet rays by a high-pressure mercury lamp having an output of 80 W/cm for 1 second in an inert atmosphere to obtain a crosslinked cured film. The physical properties of the cured film are shown in Table 1.

A fiber core formed of a methyl methacrylate polymer ($T_g$: 100° C.), which had an outer diameter of 1000 μm was spun at a drawing speed of 60 m/min. Then, the cladding composition of Run No. 1 shown in Table 1 was coated on the fiber core and the coated fiber was irradiated with ultraviolet rays by a high-pressure mercury lamp having an output of 80 W/cm to form a plastic clad plastic core optical fiber having a cladding thickness of 10 μm. The attenuation of the optical fiber was small and 172 dB/km at 650 nm. When the optical fiber was heat-treated at 100° C. for 300 hours, the shrinkage was smaller than 1%. When the temperature dependency of the light transmittance of the fiber was examined, it was found that a reduction of the light transmittance was not observed at temperatures of up to 120° C.

EXAMPLES 2 THROUGH 6

Cured films were prepared by using cladding compositions shown in Table 1 in the same manner as described in Example 1. The refractive indexes of the cured films are shown in Table 1. Each cured film was transparent and pliable.

In the same manner as described in Example 1, cladding compositions were coated on the surfaces of fiber cores of a methyl methacrylate polymer, and the light transmittance at each of the so-obtained plastic clad plastic core optical fibers was evaluated, it was found that the light transmittance of each fiber was as good as that of the optical fiber obtained in Example 1. When these optical fibers were heat-treated at 100° C. for 300 hours, the shrinkage was smaller than 1% in each fiber.

TABLE 1

| Example No. | Cladding composition | (weight %) | Transparency of composition | Transparency of cured product | Refractive index of cured product | Attenuation at 650 nm (dB/km) Start | Attenuation at 650 nm (dB/km) After treatment at 100° C. for 300 hours |
|---|---|---|---|---|---|---|---|
| 1 | $CH_2=CHCOOCH_2C_2F_5$ | 65 | Transparent | Transparent | 1.405 | 172 | 175 |
|   | $CH_2=CHCOO(CH_2)_2C_8F_{17}$ | 22 | | | | | |
|   | $CH_2=CHCOO(CH_2)_6OCOCH=CH_2$ | 11 | | | | | |
|   | Benzyldimethylketal | 2 | | | | | |
| 2 | $CH_2=CHCOOCH_2CF_3$ | 75 | Transparent | Transparent | 1.410 | 195 | 198 |
|   | $CH_2=CHCOO(CH_2)_2C_8F_{17}$ | 15 | | | | | |
|   | $CH_2=CHCOO(CH_2CH_2O)_4COCH=CH_2$ | 6 | | | | | |
|   | Benzyldimethylketal | 4 | | | | | |
| 3 | $CH_2=CHCOOCH_2CF_2CF_2H$ | 68 | Transparent | Transparent | 1.414 | 182 | 188 |
|   | $CH_2=CHCOO(CH_2)_2C_6F_{13}$ | 7.5 | | | | | |
|   | $CH_2=CHCOO(CH_2)_2C_8F_{17}$ | 10 | | | | | |
|   | $CH_2=CHCOO(CH_2)_2C_{10}F_{21}$ | 7.5 | | | | | |
|   | $(CH_2=CHCOOCH_2)_3CCH_2CH_3$ | 5 | | | | | |
|   | Benzyldimethylketal | 2 | | | | | |
| 4 | $CH_2=CHCOOCH_2CF_5$ | 77 | Transparent | Transparent | 1.415 | 188 | 195 |
|   | $CH_2=CHCOO(CH_2)_2C_8F_{17}$ | 12 | | | | | |
|   | $CH_2=CHCOOCH_2CH_2OH$ | 15 | | | | | |
|   | $(CH_2=CHCOOCH_2)_4C$ | 5 | | | | | |
|   | 1-Hydroxycyclohexyl phenyl ketone | 1 | | | | | |
| 5 | $CH_2=CFCOOCH_2C_2F_5$ | 75 | Transparent | Transparent | 1.367 | 186 | 188 |
|   | $CH_2=CFCOO(CH_2)_2C_8F_{17}$ | 12 | | | | | |
|   | $CH_2=CHCOOCH_2C(CH_3)_2CH_2OCOCH=CH_2$ | 10 | | | | | |
|   | 1-Hydroxycyclohexyl phenyl ketone | 3 | | | | | |
| 6 | $CH_2=CFCOOCH_2CF_3$ | 63 | Transparent | Transparent | 1.398 | 195 | 197 |
|   | $CH_2=CFCOOCH_3$ | 4 | | | | | |
|   | $CH_2=CFCOO(CH_2)_2C_8F_{17}$ | 18 | | | | | |
|   | $CH_2=CHCOO(CH_2)_6OCOCH=CH_2$ | 13 | | | | | |
|   | 1-Hydroxycyclohexyl phenyl ketone | 2 | | | | | |

COMPARATIVE EXAMPLES 1 THROUGH 3

The procedures of Example 1 were repeated in the same manner by using cladding compositions shown in Table 2. In each of these compositions, the mutual compatibility of the monomers was poor, and the cured product was turbid.

Optical fibers were prepared in the same manner as described in Example 1 by using the light-curable cladding compositions. The light transmittance of each optical fiber was poor and the attenuation exceeded 1000 dB/km at 650 nm.

that a polycarbonate resin ($T_g$: 141° C.) was used as the core component. The attenuation at 770 nm was 780 dB/km.

When the optical fiber was heat-treated in a thermostat tank at 130° C. for 300 hours, the shrinkage was smaller than 1%, the temperature dependency of the light transmittance was very low, and a reduction of the light transmittance was not observed at temperatures of up to 150° C. When the optical fiber was wound on a column having a diameter of 5 mm, cracking did not occur in the cladding component and separation did not occur between the cladding and the core.

TABLE 2

| Comparative Example No. | Cladding composition | (weight %) | Transparency of composition | Transparency of cured product | Refractive index of cured product | Attenuation at 650 nm (dB/km) |
|---|---|---|---|---|---|---|
| 1 | $CH_2=CHCOO(CH_2)_2C_{10}F_2$ | 86 | Opaque | Turbid | — | >1000 |
|   | $(CH_2=CHCOOCH_2)_3CCH_2CH_3$ | 12 | | | | |
|   | 1-Hydroxycyclohexyl phenyl ketone | 2 | | | | |
| 2 | $CH_2=CHCOOCH_2CF_3$ | 30 | Opaque | Turbid | — | >1000 |
|   | $CH_2=CHCOO(CH_2)_2C_{10}F_{21}$ | 60 | | | | |
|   | $(CH_2=CHCOOCH_2)_4C$ | 8 | | | | |
|   | 1-Hydroxycyclohexyl phenyl ketone | 2 | | | | |
| 3 | $CH_2=CHCOOC_2F_5$ | 23 | Opaque | Turbid | — | >1000 |
|   | $CH_2=CHCOO(CH_2)_2C_8F_{17}$ | 53 | | | | |
|   | $CH_2=CHCOOCH_2CH_2OH$ | 5 | | | | |
|   | $(CH_2=CHCOOCH_2)_3CCH_2CH_3$ | 14 | | | | |
|   | Benzyl dimethyl ketal | 5 | | | | |

EXAMPLE 7

A plastic clad plastic core optical fiber was prepared in the same manner as described in Example 1 except

EXAMPLE 8

A plastic clad plastic core optical fiber was prepared in the same manner as described in Example 1 except that an N-methylmethacrylimide/methyl methacrylate copolymer (heat distortion temperature : 136° C., $T_g$: 140° C.) containing 70% by weight of polymer units represented by the following formula:

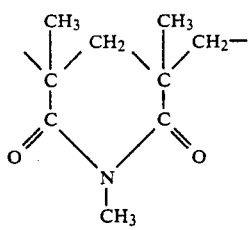

was used as the core component. The attenuation of the obtained optical fiber was 435 dB/km at 590 nm and 525 dB/km at 650 nm. When the optical fiber was held in a thermostat tank at 135° C. for 100 hours, the thermal shrinkage was substantially zero and the attenuation was 535 dB/km at 650 nm.

EXAMPLES 9 AND 10

A plastic clad plastic core optical fiber was prepared in the same manner as described in Example 8 except that the proportion of the N-methylmethacrylimide units to methyl methacrylate units in the N-methylmethacrylimide/methyl methacrylate copolymer used as the core component was changed as shown in Table 3. The attenuation and thermal resistance of each of the obtained optical fibers are shown in Table 3.

TABLE 3

| | Composition of copolymer as core component | | Glass transition | Attenuation at 650 nm (dB/km) | |
|---|---|---|---|---|---|
| Example No. | N-methylmethacryl-imide units (weight %) | Methyl methacylate units (weight %) | temperature of copolymer (°C.) | Start | After treatment at 135° C. for 300 hours |
| 9 | 75 | 25 | 152 | 470 | 485 |
| 10 | 80 | 20 | 161 | 495 | 508 |

EXAMPLES 11 THROUGH 15

A cured film was prepared in the same manner as described in Example 1 except that a stabilizer shown in Table 4 was added to the light-curable composition of Run No. 1 shown in Table 1. Each cured film was transparent and did not discolor even after heat-treatment at 200° C. for 100 hours.

Separately, in the same manner as described in Example 2, a fiber composed of a polycarbonate resin was coated with the above-mentioned stabilizer-incorporated cladding composition to obtain a plastic clad plastic core optical fiber. The light transmittance and thermal resistance were evaluated. The obtained results are shown in Table 4. It can be seen from these results that the heat resistance was improved.

TABLE 4

| | | | Attenuation at 770 nm (dB/km) | |
|---|---|---|---|---|
| Example No. | Stabilizer | (weight parts)* | Start | After treatment at 130° C. for 300 hours |
| 11 | 2,6-Di-t-butyl-4-methylphenol | 0.5 | 820 | 832 |
| | Dilauryl thiodipropionate | 0.5 | | |
| 12 | 4,4'-Thiobis(3-methyl-6-t-butylphenol) | 0.5 | 795 | 810 |
| 13 | 1,6-Hexanediol-bis[3-(3,5-di-t-butyl-hydroxyphenyl)propionate] | 0.25 | 810 | 824 |
| | Dilauryl thiodipropionate | 0.5 | | |
| 14 | Triethylene glycol-bis-3-(3-t-butyl-4-hydroxy-5-methylphenyl)propionate | 0.5 | 793 | 805 |
| 15 | 2,2'-Methylenebis(4-methyl-6-t-butylphenol) | 0.25 | 798 | 817 |
| | Dilauryl thiodipropionate | 0.5 | | |

*Parts by weight per 100 parts by weight of the light-curable resin composition

We claim:

1. A plastic clad plastic core optical fiber comprising a plastic core with a reflective index $n_1$ and an ultraviolet ray-cured cladding composition with a refractive index $n_2$, wherein said ultraviolet ray-cured cladding composition is a cured product of a cladding composition comprising:

(a) an ultraviolet ray-curable monofunctional acrylic monomer mixture comprising a highly fluorinated monofunctional acrylate or α-fluoroacrylate represented by the following formula (I):

$$CH_2=\overset{X}{\underset{|}{C}}-COO(CH_2)_l(CF_2)_mY \quad (I)$$

wherein X and Y represent H or F, l is an integer of from 1 to 12 and m is an integer of from 5 to 12, and a lowly fluorinated monofunctional acrylate or α-fluoroacrylate represented by the following formula (II):

$$CH_2=\overset{X}{\underset{|}{C}}-COOCH_2(CF_2)_nY \quad (II)$$

wherein X and Y represent H or F and n is an integer of from 1 to 3, (b) a polyfunctional acrylate or α-fluoroacrylate having at least two acryloyl or α-fluoroacryloyl radicals in the molecule, and (c) a photoinitiator, and the difference ($n_1 - n_2$) between the refractive index $n_1$ of the plastic core and the refractive index $n_2$ of the cured cladding composition is at least 0.01.

2. A plastic clad plastic core optical fiber as set forth in claim 1, wherein the ultraviolet raycurable monofuncitonal acrylic monomer mixture has a refractive index smaller than 1.38.

3. A plastic clad plastic core optical fiber as set forth in claim 1, wherein the cladding composition comprises at least 50% by weight of the ultraviolet ray-curable monofunctional acrylic monomer mixture.

4. A plastic clad plastic core optical fiber as set forth in claim 1, wherein the cladding composition comprises 50 to 98% by weight of the ultraviolet ray-curable monofunctional acrylic monomer mixture, 1 to 20% by weight of the polyfunctional acrylate or α-fluoroacrylate, 0.01 to 10% by weight of a photoinitiator and 0.05 to 10% by weight of at least one stabilizer selected from the group consisting of thiodicarboxylic acid esters and hindered phenols.

5. A plastic clad plastic core optical fiber as set forth in claim 1, wherein the plastic core is composed of a polymer having a glass transition temperature of at least 100° C.

6. A plastic clad plastic core optical fiber as set forth in claim 5, wherein the plastic core is composed of a polymer having a glass transition temperature of at least 120° C.

7. A plastic clad plastic core optical fiber as set forth in claim 6, wherein the plastic core is composed of a polymer selected from the group consisting of polycarbonates, polymers having recurring base units represented by the following formula (III):

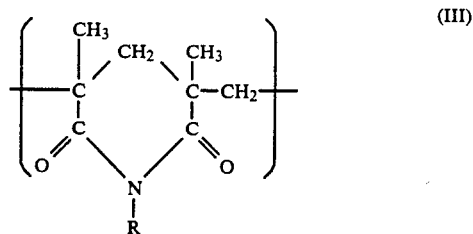

wherein R represents a hydrogen atom, an alkyl group having 1 to 20 carbon atoms, a cycloalkyl group having 3 to 20 carbon atoms or a phenyl group, and 4-methylpentene-1 polymers.

8. A plastic clad plastic core optical fiber as set forth in claim 1, wherein, in the monofunctional acrylic monomer mixture, m in the formula (I) is an integer of from 7 to 10 and n in the formula (II) is an integer of 1 or 2.

9. A plastic clad plastic core optical fiber as set forth in claim 1, wherein the ultraviolet ray-curable monofunctional acrylic monomer mixture comprises 1 to 60% by weight of the highly fluorinated monofunctional acrylate or α-fluoracrylate of the formula (I) and 99 to 40% by weight of the lowly fluorinated monofunctional acrylate or α-fluoroacrylate of the formula (II).

* * * * *

UNITED STATES PATENT AND TRADEMARK OFFICE
CERTIFICATE OF CORRECTION

PATENT NO. : 5,022,737

DATED : June 11, 1991

INVENTOR(S) : YAMAMOTO et al.

It is certified that error appears in the above-identified patent and that said Letters Patent is hereby corrected as shown below:

Abstract, line 6, delete "fluoroacryloy" and insert --fluoroacryloyl--;

line 10, delete "inhibits" and insert --exhibits--.

Claim 1, col. 10, line 31, delete "reflective" and insert --refractive--;

col. 10, line 52, delete "COOCH$_2$(CF$_2$)$_n$Y(II)" and insert --COOCH$_2$(CF$_2$)$_n$Y     (II)--;

col. 11, line 1, after "and" BEGIN A NEW LINE.

Claim 2, col. 11, lines 6 and 7 delete "raycurable monofuncitonal" to --ray-curable monofunctional--.

UNITED STATES PATENT AND TRADEMARK OFFICE
CERTIFICATE OF CORRECTION

PATENT NO. : 5,022,737

DATED : June 11, 1991

INVENTOR(S) : YAMAMOTO et al.

It is certified that error appears in the above-identified patent and that said Letters Patent is hereby corrected as shown below:

<u>Claim 9</u>, col. 12, line 27, change "α-fluoracrylate" to --α-fluoroacrylate--.

Signed and Sealed this

First Day of December, 1992

Attest:

DOUGLAS B. COMER

Attesting Officer

Acting Commissioner of Patents and Trademarks